July 18, 1944.   E. R. PRICE   2,353,755
POWER BRAKE
Filed Dec. 5, 1940   3 Sheets-Sheet 1

INVENTOR
EARL R. PRICE
BY
M. W. McConkey
ATTORNEY

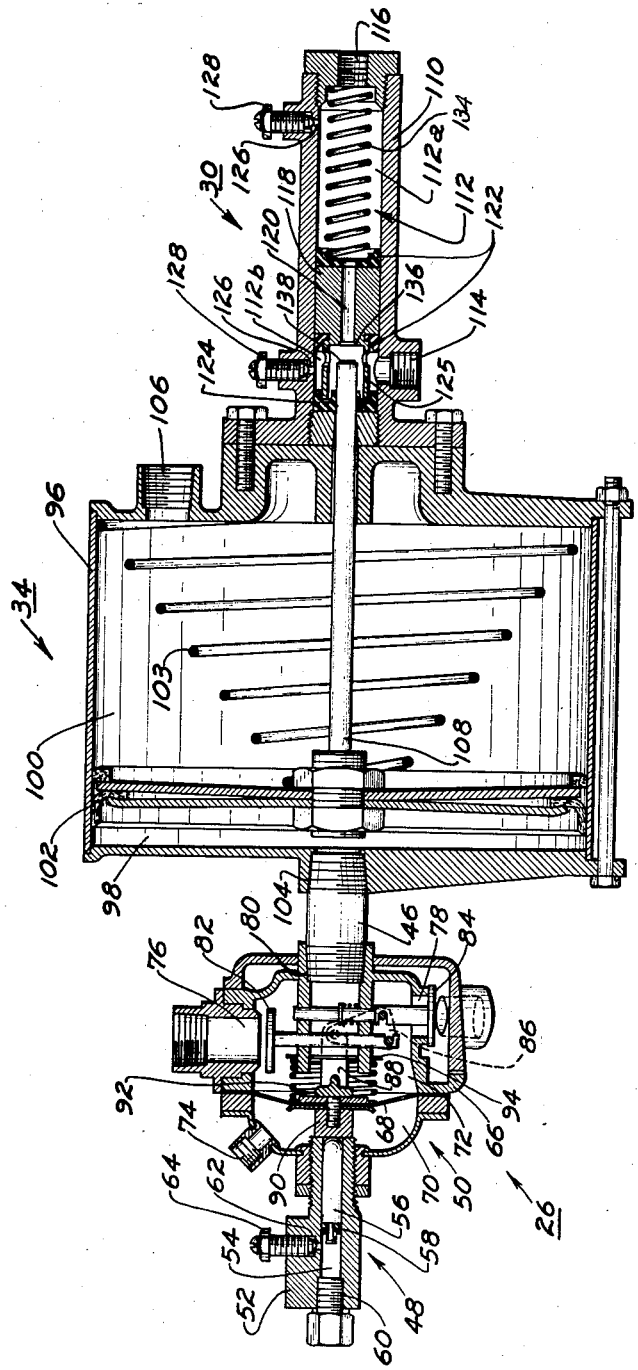

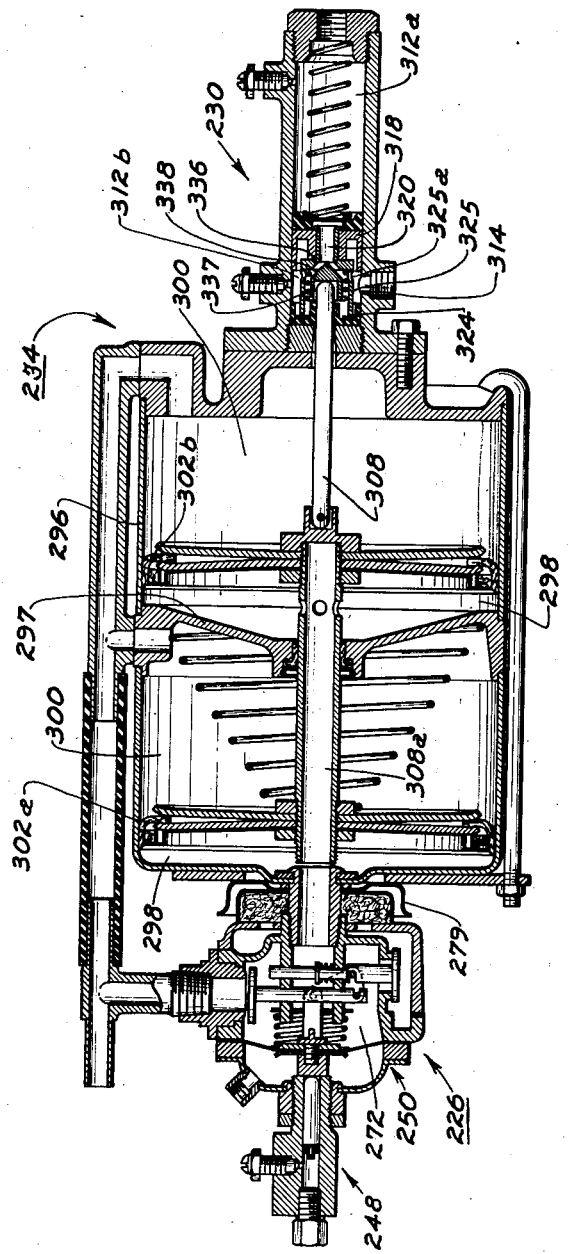

Patented July 18, 1944

2,353,755

UNITED STATES PATENT OFFICE 2,353,755

POWER BRAKE

Earl R. Price, South Bend, Ind., assignor to Bendix Aviation Corporation, South Bend, Ind., a corporation of Delaware Application December 5, 1940, Serial No. 368,560

10 Claims. (Cl. 188—152)

This invention relates to power devices and particularly to power devices which are operated by differences in pneumatic pressure. In the device illustrated the pneumatic pressure differential is utilized to create pressure in a hydraulic liquid.

The background used for explanation of the invention is a hydraulic braking system of the type conventional in automotive vehicles. A power motor is added to the hydraulic system and is operated in response to hydraulic line pressures in one part of the system while at the same time it acts to create brake applying pressures in the hydraulic liquid in another portion of the system.

An important object of my invention is to provide a braking system having a combination of manual and power means for creating pressure therein, having an extremely compact and simple installation, and capable of combination with any type of original braking system.

A second object of my invention is the development of a hydraulic brake which is operated in part by power means, but which in addition allows the use of manual brake applying pressure both before and after the power means has come into operation. The pressures created manually are added to the power created pressures and cooperate with them in applying the brakes.

A further object of my invention is to provide a brake partially operated by power which creates when it is operated a reaction on the manually operated pedal or other control means—a reaction proportional to the pressure which is applying friction parts of the brake to the brake drum. In addition, the brake described herein is position-sensitive, i. e., for progressively greater applications of pressure to the brakes the brake control pedal must be moved progressively farther in a brake applying direction.

A feature of my invention is the use of an auxiliary hydraulic cylinder having a piston therein with a passage through the piston, the arrangement being such that application of manual force to the brakes immediately creates pressure in the brake lines ahead of the piston in the auxiliary cylinder, at the same time operating a valve to bring into action an associated power cylinder. The power cylinder through a rod connected thereto applies force against the said piston in the auxiliary cylinder closing the passage therethrough and further manually applied pressure then operates to increase the pressure in the power unit and at the same time to exert pressure against the rear of the piston in the auxiliary cylinder adding the increased manually created pressure to the pressure developed by the power unit. A feature of my device is the use of a self-aligning valve element operated by the power cylinder rod to close the passage through the auxiliary cylinder piston whenever the power cylinder begins to actuate the piston.

Other advantages, objects and desirable features of my invention will become apparent during the course of the ensuing description, reference being had to the accompanying drawings, in which:

Figure 2 shows in section the particular parts of the braking system in which the invention resides, including the power unit, a control valve for operating the said power unit, and an auxiliary hydraulic cylinder which can be connected to conventional wheel cylinders; and Fig. 3 shows in section a modification of the device of Figure 2.

Figure 1:
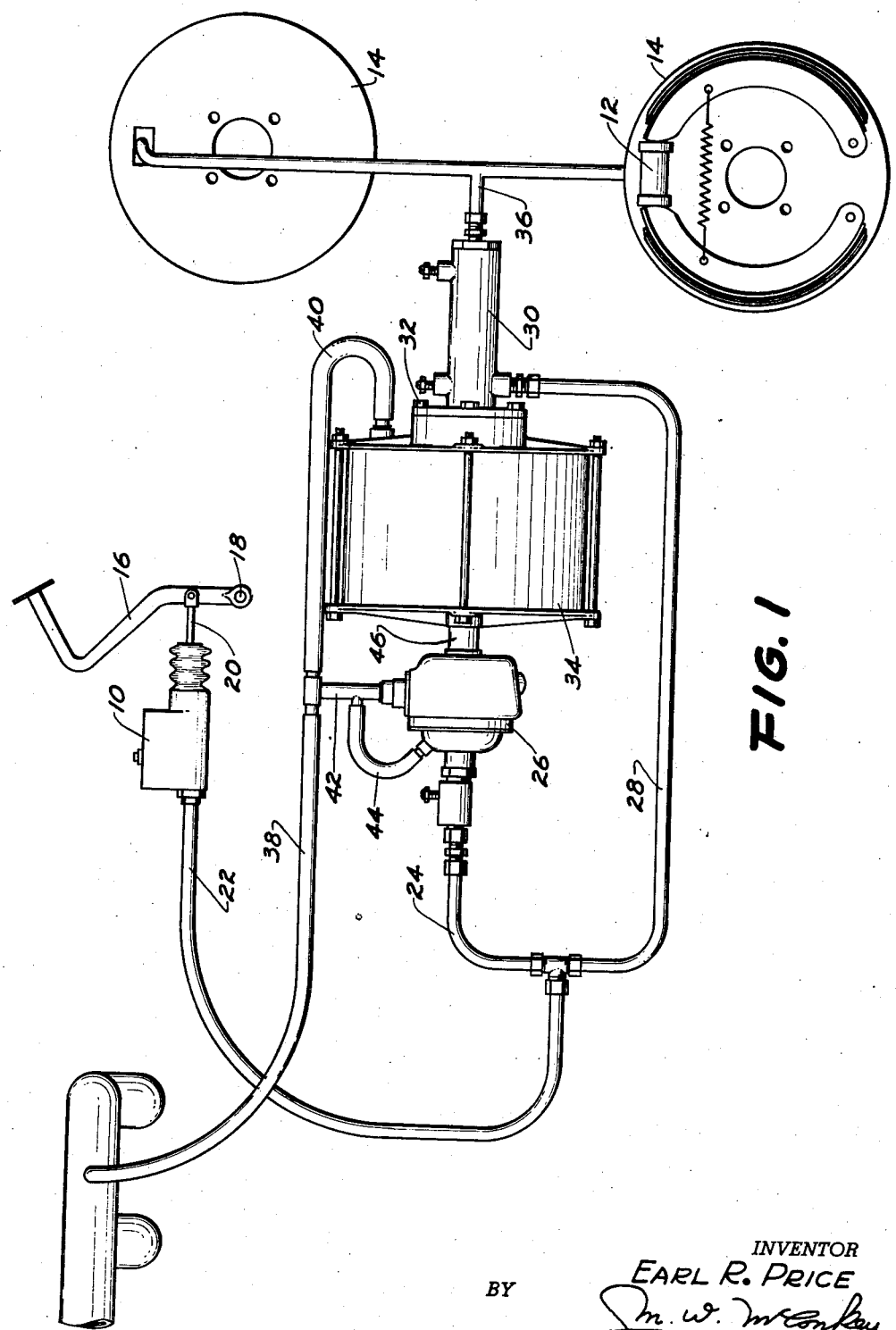
Figure 1 shows diagrammatically a brake system including my improved means for assisting the manual operation of the brakes by adding power thereto.

A braking system illustrated diagrammatically in Figure 1 includes a conventional master cylinder 10 adapted to put liquid under pressure and a plurality of conventional wheel or motor cylinders 12 adapted to apply brakes 14 under the influence of the liquid under pressure. A manually operable pedal 16, pivoted at 18, has a rod 20 extending into the interior of the master cylinder 10 and secured to a piston (not shown) for putting the liquid in the master cylinder under the pressure in response to manual actuation of the pedal 16. A liquid carrying conduit 22 is connected to the master cylinder 10 at the master cylinder outlet. The conduit 22 has a branch 24 connected to a control or relay valve 26, and a branch 28 connected to an auxiliary or intermediate hydraulic cylinder 30. The cylinder 30 is secured by any suitable means, as a series of bolts 32, to the casing of a pneumatic or vacuum power cylinder 34. The outlet end of the auxiliary cylinder 30, i. e., the end away from the power cylinder 34, is connected by a liquid carrying conduit 36 and a plurality of branches thereof to the wheel cylinders 12.

A pneumatic or vacuum-carrying line 38, extending from a source of vacuum, as for example the usual intake manifold, is connected by a branch 40 to the right side of the power cylinder 34, i. e., the side farthest from the relay valve 26. A branch 42 of the line 38 extends to one side of the relay or control valve 26. A line 44 connects the branch line 42 to the left end of the relay valve 26, the left end being the end farthest from the power cylinder 34. A pneumatic pressure carrying line 46 connects one end of the relay valve 26 to the left or near end of the power cylinder 34.

Figure 2 shows the relay valve 26, the power cylinder 34 and the auxiliary hydraulic cylinder 30 all in cross section. The valve 26 comprises a hydraulic unit indicated generally at 48 and a pnuematic pressure unit indicated generally at 50. The hydraulic unit 48 includes a casing 52 having a chamber 54 therein. Reciprocable in the chamber is a piston 56 having a flexible seal 58 at the left end thereof to prevent leakage of hydraulic liquid past the piston into the pneumatic pressure unit 50. The casing 52 has a port 60 connected to the branch hydraulic conduit 24 which in turn is connected by the conduit 22 with the master cylinder 10. A bleed opening 62 is provided at the top of the hydraulic unit 48 and a bleeder screw 64 is inserted in the opening 62.

The pneumatic pressure portion 50 of the control or relay valve 26 includes a casing 66 and a diaphragm 68 which divides the interior of the casing into two pressure chambers, 70 and 72. The chamber 70, which is at the left of the diaphragm, i. e., on the side toward the hydraulic unit 48, has a port 74 which connects the chamber 70 with the vacuum line 44. The chamber 72 has three ports opening thereinto, a vacuum port 76 which is connected to the vacuum line 42, an atmospheric port 78 which communicates when it is open with air at atmospheric pressure, and a port 80 which connects the chamber 72 through line 46 to one end of the power cylinder 34. The port 80 and line 46 are at all times open and unobstructed, allowing the free intercommunication of air molecules between the chamber 72 and one end of the power cylinder 34. The same unit pressure will therefore prevail in the said chamber as prevails in the left end of the power cylinder. Poppet valves 82 and 84 are provided for controlling respectively the vacuum port 76 and the atmospheric port 78. The valves 82 and 84 are connected to a triangular lever 86 which in turn is connected to a rod or thrust element 88, the arrangement of the several connected parts being such that movement of the rod 88 toward the left or toward the hydraulic unit 48 tends to open the vacuum port 76 and close the atmospheric port 78, while movement of the rod 88 toward the right or away from the hydraulic unit 48 tends to close the vacuum port 76 and open the atmospheric port 78. As the rod 88 moves toward the right on its power cylinder operating stroke, it first turns the triangular lever 86 about its pivot on the atmospheric valve stem to close the vacuum port 76 and thereafter turns the triangular lever about its pivot on the vacuum valve stem to open the atmospheric port 78. In the opposite direction, the rod first closes the atmospheric port and then opens the vacuum port. For a fuller explanation of the operation of this type of two-port control Johnson Patent No. 2,111,322 may be referred to. The rod 88 is connected to the diaphragm 68 and moves with it whenever the diaphragm flexes under the influence of force applied thereagainst. A projecting element or nut 90 is secured to the diaphragm and rod assembly adjacent the center of the diaphragm. The said element 90 therefore moves with the diaphragm. The element 90 normally contacts at its outer end the right end of the piston 56. It will thus be apparent that movement of the piston 56 under the influence of hydraulic pressure in the chamber 54 moves the rod 88 in the same direction and through the medium of the rod 88 operates to change the pressure prevailing in the chamber 72 by changing the positions of the poppet valves 82 and 84. Since the chamber 70 is at all times connected to vacuum, any pressure greater than manifold vacuum in the chamber 72 will exert a force tending to move the diaphragm 68, rod 88 and piston 56 toward the left. In order to assure a vacuum on both sides of the diaphragm 68 when the brakes are released and a vacuum is necessary in the left side of the power cylinder 34, a spring 92 is interposed between the diaphragm 68 and a retaining ring 94, the said spring urging the diaphragm to the left to hold the operating parts of the control valve 26 in released position.

The power cylinder 34 comprises a casing 96 having the interior thereof divided into two chambers 98 and 100 by a piston 102, the piston 102 being normally (i. e., when the brakes are released) urged toward the left by a spring 103. A port 104 connects chamber 98 to the control line or conduit 46, while port 106 connects the chamber 100 to the vacuum line or conduit 40. Secured to the piston 102 adjacent the center thereof and movable with the said piston is a rod 108. The end of the rod 108 away from the piston 102 extends into the interior of the auxiliary hydraulic cylinder 30. The piston 102 and, consequently, the rod 108 are movable within the casing 96 in accordance with the relation to one another of the pressures prevailing in chambers 98 and 100. Chamber 100 is at all times maintained under manifold vacuum, while chamber 98 has a pressure equivalent to that in the chamber 72 of hydraulic relay valve 26.

The auxiliary hydraulic cylinder 30 comprises a casing 110 having therein a chamber 112 and having a port 114 connected to the hydraulic line 28 and a port 116 connected to the hydraulic line 36. The port 114 is arranged to admit to chamber 112 pressure liquid from the master cylinder 10, while the port 116 is arranged to allow the flow of pressure liquid from the chamber 112 to the wheel cylinders 12.

In the chamber 112 is a piston 118 having a passage 120 through the approximate center thereof. Annular sealing elements 122 are provided at both ends of the piston 118 to prevent the leaking of liquid in either direction between the outer surface of the piston 118 and the interior of the casing 110. As stated above the piston rod 108 extends into the interior of chamber 112, and an annular sealing element 124 encircles the end of the rod 108 which extends into chamber 112. An annular projection 125, integral with the piston 118, extends from the left end of the piston toward the sealing element 124. This projection serves to prevent the piston 118 from moving so far to the left as to cover the port 114. A pair of bleed outlets 126 are provided at the top of the auxiliary hydraulic cylinder 30, and bleed screws 128 are inserted in the said outlets. The piston 118, therefore, is reciprocable in the chamber 112 between the port 114 and the port 116. A spring 134 normally urges the piston 118 to the left, holding the projection 125 against the center of the sealing element 124.

The piston 118 may be considered as dividing the chamber 112 into two chambers, 112a and 112b. When the brakes are released the passage 120 through the piston 118 allows free communication between chambers 112a and 112b. Adjacent the chamber 112b, the piston 118 is provided with a valve seat 136, and the end of piston rod 108 which extends into the chamber 112b is formed as a valve element 138 to at times cooperate with the valve seat 136 in closing the passage 120 and preventing communication between chambers 112a and 112b. When the brakes are released and the power cylinder piston 102 is suspended in vacuum, the spring 103 operates to hold the valve element 138 from the valve seat 136, the leftward movement of the piston 118 and valve seat 136 being limited by the projection 125.

The operation of my invention is as follows. Force applied to the pedal lever 16 causes the expulsion of liquid under pressure from the master cylinder 10 and this pressure liquid is carried through the conduit 22 to branch conduits 24 and 28. The pressure liquid which moves through the branch conduit 28 flows into the chamber 112b, through the passage 120, into the chamber 112a and from there through the port 116 and the conduit 36 to the several wheel cylinders tending to cause application of the brakes. At the same time pressure liquid flowing through the branch conduit 24 enters the hydraulic unit 48 of the control valve 26 through the port 60 and moves the piston 56 to the right, pushing the rod 88 in the pneumatic unit 50 of the said control valve 26. Movement of the rod 88 operates to first close the vacuum port 76 cutting off connection between the chamber 98 of power cylinder 34 and the vacuum source, and to then open the atmospheric port 78 allowing air under atmospheric pressure to enter chamber 72 in the control valve and chamber 98 in the power cylinder. The greater than vacuum pressure in chamber 98, operating against the vacuum in chamber 100, moves the piston 102 to the right pushing the piston rod 108 and its valve portion 138 against the valve seat 136 of the piston 118. Communication between chambers 112a and 112b of the auxiliary cylinder 30 is therefore cut off. Further movement to the right of the piston 102 forces the piston 118 to the right and causes the ejection of pressure liquid from the chamber 112a through the port 116 to the wheel cylinders to apply pressure to the brakes.

After the power cylinder 34 has been brought into action in response to actuation of the control valve 26, the passage 120 through the piston and the auxiliary hydraulic cylinder is closed by the end of rod 108 preventing further flow of fluid from the conduit 28 into chamber 112a. However, the pressure fluid in the conduit 28 continues to flow into the chamber 112b increasing the pressure therein and exerting a force against the left end of the piston 118 to assist the pneumatic power device in moving the piston 118 toward the right to apply the brakes. The manual pressure applied by the operator continues to be effective in applying the brakes after the power unit has been brought into action and the total brake applying pressure is substantially greater than that obtainable in any instance where the operation of the power unit prevents further manually created pressure from assisting in the application of the brakes. Since the control valve 26 is of the reaction type, a certain amount of manual pressure on the fluid in the master cylinder is necessary to create a given increment of pressure differential over the power cylinder piston 102. By utilizing in the auxiliary cylinder 30 the pressure necessary to operate the valve 26, a net gain in brake applying pressure has been accomplished without increase in manual pressure. When, after application, it is desired to release the brakes, manual pressure on the pedal is eliminated. Pressure in the master cylinder 10 is thus lowered, releasing the pressure in hydraulic chamber 54 and allowing the pressure in chamber 72 and the force exerted by the spring 92 to close the atmospheric port and open the vacuum port of the hydraulic relay valve. The air in chamber 98 of the power cylinder is now evacuated and the piston 102 moves to its leftward or brake released position under the influence of the spring 103. At the same time the piston 118, no longer having either manually created or power created pressure behind it, moves to the left under the influence of pressure in the chamber 112a and under the influence of retracting springs in the wheel brakes which tend to force the brake applying liquid back from the wheels in the direction of the master cylinder. As the passage through piston 118 is uncovered, the liquid trapped on the wheel cylinder side of the piston comes into free communication with the hydraulic conduits 22 and 28 and the master cylinder 10.

The reaction in the relay or control valve 26 occurs as follows. The closing of vacuum port 76 and opening of atmospheric port 78 which result from movement of piston 56 to the right under liquid pressure cause the admission to chamber 72 of air molecules under higher than vacuum pressure. Since chamber 70 is at all times connected to vacuum, the admission of air to chamber 72 creates a pressure differential over diaphragm 68, tending to move the diaphragm and its associated rod 88 and nut 90 to the left against the force exerted by the piston 56. When the differential over the diaphragm is sufficient to counteract the hydraulic pressure in chamber 54, the poppet valves 82 and 84 move to lapped position, wherein both atmospheric and vacuum ports of chamber 72 are closed. A further increase of pneumatic power will not occur in the power cylinder 34 until the hydraulic pressure in chamber 54 is increased. Thus it will be apparent that the power applied by the cylinder 34 will be proportional to the pressure of the hydraulic liquid in chamber 54. Since the pressure in chamber 112a of auxiliary cylinder 30 depends upon and is proportional to the pressure in the power cylinder, and since the hydraulic pressure in chamber 54 is proportional to the manual pressure applied at the pedal, the brake applying pressure will at all times be proportional to the manual pressure. The manually created pressure which is exerted against the left side of piston 118 is, of course, proportional to the manual pressure on the pedal. Obviously then the total brake applying pressure, manual plus power, is proportional to the manual pressure. There is a period when the brake is first applied in which the manual pressure alone tends to apply the brakes, and there also may be a period after the power cylinder has acquired its full effectiveness when the only added pressure on the brakes will be created manually. During this short beginning period and the period after the power has ceased to add further pressure, the leverage ratio of line pressure to pedal pressure for each added increment of manual force will be less than the leverage ratio during the period when manual and power created forces are cooperating in applying the brakes.

Position-sensitive progressive control of the system occurs as follows. During the period when the master cylinder 10 is connected through the passage 120 in piston 118 to the wheel cylinders, the movement of fluid toward the wheel cylinders to apply the brakes makes it necessary for the operator to progressively move the master cylinder pedal in order to progressively increase the brake applying pressure. After the power cylinder 34 has begun to operate the passage 120 will be closed, but, since the piston 118 moves forward, the volume of fluid behind the piston 118 in cylinder 30 will increase. This increased volume may be supplied from either of two sources—the hydraulic chamber 54 of the control valve 26 or the master cylinder 10. If the master cylinder piston is not progressively moved forward by progressive pedal movement, the pressure differential over the diaphragm 68 in control valve 26 will force fluid from chamber 54 toward the volume-increasing chamber behind piston 118. If this happens, valve 26 will move to lapped position, and the brake applying pressure will not increase until the master cylinder pedal is further depressed to reopen the valve 26.

The device of Figure 3 is substantially similar in operation to the device of Figure 2. The numerals of Figures 1 and 2 with the addition of 200 will be used in referring to similar prats in Figure 3.

In Figure 3 is shown the combination of a relay or control valve 226 with a power cylinder unit 234 and an auxiliary hydraulic cylinder 230. The control or relay valve 226 includes an air cleaner 279 which operates to prevent impurities from being carried by the entering air into the interior of the valve. The relay valve 226 includes a hydraulic unit 248 and a pneumatic pressure unit 250, and is in both parts and operation similar to the relay valve 26 of Figure 2.

The power cylinder 234 is a cylinder of the tandem piston type. It includes a casing 296 having a vertical partition 297 disposed approximately in the center thereof. A pair of pistons 302a and 302b are reciprocable in the power cylinder 234, one on each side of the partition 297. The pistons 302a and 302b are connected for movement in unison by a hollow rod 308a. On the left side of each piston is a chamber 298 connected to chamber 272 of control valve 226. Chambers 298 are at all times therefore subject to the pneumatic pressures created by the operation of control valve 226. At the right side of each piston is a chamber 300 which is at all times connected to vacuum.

The auxiliary hydraulic cylinder 230 includes a piston 318 having a passage 320 through the center thereof. An annular projecting element 325 is secured to the piston by a flange of the element 325 which extends through passage 320. The left end of the element 325 rests, when the brakes are released, against a sealing element 324 to prvent leftward movement of the piston 318. A valve seat 336 is provided in the interior of the annular element 325 and a cooperating valve member 338, arranged to at times move to valve seat 336 to close passage 320, is held, when the brakes are released, away from the valve seat and against the right end of power cylinder piston rod 308 by a spring 337. The valve member 338 is capable of universal swivelling movement with respect to the end of rod 308 so as to be self-aligning with the valve seat 336. The valve member is pivoted on the end of the rod at a single point, and the rearward or annular portion of the valve member is spaced from the rod and from the element 325 at all points. The forward end of the valve member is conical, and the valve seat is formed as the frustrum of the cone in order that the seal may be effective. A plurality of ports 325a are provided in the sides of the element 325 to allow free communication of liquid between port 314 and chamber 312a when the brakes are released and the passage 320 is open.

This modification operates in the same manner as the device of Figure 2. Hydraulic line pressure created by the master cylinder first tends to directly actuate the brakes and at the same time opens the control valve 226 to bring the power cylinder 234 into operation. From then on application of the brakes is accomplished by the combined manual and power pressures tending to build up pressure on the liquid in chamber 312a of the auxiliary cylinder 230.

Hydraulic brake systems in which pneumatic power units are used generally fall into two major groups. The first group includes those braking systems in which the manually created pressure and the power created pressure are added together to create the brake operating line pressure. The second group includes those braking systems where the manually created pressure opens a valve controlling the power unit and from that time on the power unit alone creates the brake applying line pressure.

Braking systems of the first group have in the past been so arranged that the power unit exerts its force to move the piston in the master cylinder. It is necessary in such a system that the power unit be connected to the pedal lever or to the master cylinder rod. These power units therefore have to be adaptable to the particular type of vehicle on which they are to be used so that the space may be sufficient and the leverage arrangements and connections may be proper. My improved device has an advantage over units of this type inasmuch as the component parts thereof, i. e., the control valve, the power cylinder and the auxiliary cylinder, may be made up as a unit and may be placed in any desired position on the vehicle without inconvenience, since the only connections between the master cylinder and the unit are conduit connections.

Braking systems of the second group permit the same ease of installation allowed by my device but they do not utilize the manually created pressure except to bring the power unit into operation. The manual pressure in units of this group actuates the power unit and the power unit applies the brakes. My device has the advantage over units of this type that it adds the manually created pressure to the power created pressure in applying the brakes. Thus the manual pressure is utilized to increase the brake pressure when otherwise it would be utilized merely to operate some sort of control valve.

While I have described two specific embodiments of my invention, it is obvious that other modifications may be developed without departing from the scope of my invention, and it is therefore my intention not to limit my invention in any manner whatsoever except by the terms of the appended claims.

I claim:

1. A combined hydraulic and pneumatic control system comprising a master cylinder, a motor cylinder, an auxiliary master cylinder, a piston in the auxiliary cylinder having a passage therethrough with a valve seat formed at the end thereof, a connection between the motor cylinder and the auxiliary cylinder on one side of the piston, a connection between the master cylinder and the auxiliary cylinder on the other side of the piston, power means for exerting force on the piston, and means associated with the power means for closing the passage through the piston, said last named means comprising a rod connected to the power means and a valve for closing the passage capable of universal swiveling movement relative to the rod so as to be self-aligning with the valve seat on the piston.

2. A combined hydraulic and pneumatic control system comprising a master cylinder, a motor cylinder, a cylinder intermediate the master cylinder and motor cylinder, a piston in the intermediate cylinder having a passage therethrough, a connection between the motor cylinder and the intermediate cylinder on one side of the piston, a connection between the master cylinder and the intermediate cylinder on the other side of the piston, power means for exerting force on the piston, means associated with the power means for closing the passage through the piston, said means comprising a rod connected to the power means and a valve member urged to seat on the piston by the rod but movable relative to the rod and adapted to find its own seat on the piston, a valve for controlling the operation of the power means, and a connection between the valve and the master cylinder-intermediate cylinder connection.

3. A braking system comprising a hydraulic master cylinder normally having liquid therein, manual means for applying pressure to the liquid in the master cylinder, an auxiliary hydraulic cylinder having a plurality of ports therein, a conduit connecting the master cylinder to one of the ports of the auxiliary cylinder whereby liquid under pressure may be transmitted from the master cylinder to the auxiliary cylinder, a brake, a hydraulic wheel cylinder for actuating the brake, a conduit connecting the wheel cylinder to one of the ports of the auxiliary cylinder, a piston having a passage therethrough and reciprocable in the auxiliary cylinder between the port connected to the master cylinder and the port connected to the wheel cylinder, a valve seat formed at the entrance of said passage, a pneumatic pressure cylinder, a rigid piston slidably mounted in the pneumatic pressure cylinder and movable under the impulse of pneumatic pressure differentials, and a solid element having one end supported by said piston and the other end terminating in a valve element whose free end is adapted to engage the valve seat formed in said auxiliary cylinder piston, said solid element extending into the auxiliary cylinder so that movement of the said rigid piston may at times cause the said solid element to close the passage through the piston in the auxiliary cylinder and to exert a force tending to move the last mentioned piston, said solid element having a cross-sectional diameter less than the diameter of the piston in the auxiliary cylinder.

4. A braking system comprising a hydraulic master cylinder normally having liquid therein, manual means for applying pressure to the liquid in the master cylinder, an auxiliary hydraulic cylinder having a plurality of ports therein, a conduit connecting the master cylinder to one of the ports of the auxiliary cylinder whereby liquid under pressure may be transmitted from the master cylinder to the auxiliary cylinder, a brake, a hydraulic wheel cylinder for actuating the brake, a conduit connecting the wheel cylinder to one of the ports of the auxiliary cylinder, a piston having a passage therethrough and reciprocable in the auxiliary cylinder between the port connected to the master cylinder and the port connected to the wheel cylinder, a pneumatic pressure cylinder, a member in the pneumatic pressure cylinder movable under the impulse of pneumatic pressure differentials, a rod for at times connecting the member in the pneumatic pressure cylinder to the piston in the auxiliary hydraulic cylinder, and valve means associated with said rod for closing the passage through the said piston, said valve means comprising a valve member and a valve seat having contours whose mating is not affected by slight misalignment or eccentricity of the rod.

5. A braking system comprising a hydraulic master cylinder normally having liquid therein, manual means for applying pressure to the liquid in the master cylinder, an auxiliary hydraulic cylinder having a plurality of ports therein, a conduit connecting the master cylinder to one of the ports of the auxiliary cylinder whereby liquid under pressure may be transmitted from the master cylinder to the auxiliary cylinder, a brake, a hydraulic wheel cylinder for actuating the brake, a conduit connecting the wheel cylinder to one of the ports of the auxiliary cylinder, a piston having a valve seat formed at the entrance to a passage therethrough and reciprocable in the auxiliary cylinder between the port connected to the master cylinder and the port connected to the wheel cylinder, a pneumatic pressure cylinder, a rigid piston slidably mounted in the pneumatic pressure cylinder and movable under the impulse of pneumatic pressure differentials, a rod for at times connecting the piston in the pneumatic pressure cylinder to the piston in the auxiliary hydraulic cylinder and simultaneously closing the passage through the last mentioned piston, said rod being supported at one end by the piston and the other end terminating in a valve element whose free end is adapted to engage the valve seat formed in said auxiliary cylinder piston, a control unit for regulating the pressure differential over the piston in the pneumatic pressure cylinder, and hydraulic means for operating the control unit according to the pressure in the master cylinder.

6. A brake actuating system comprising a hydraulic motor, a first hydraulic pressure device including a movable wall for operating the hydraulic motor, a second hydraulic pressure device normally directly connected when the hydraulic motor is under little or no pressure with the motor through the first pressure device, power means for building pressure in the first hydraulic pressure device to operate the motor and for simultaneously cutting off the direct hydraulic connection between the second pressure device and the motor, a valve for controlling the power means which must have a progressively increasing force exerted on it in order to progressively increase the effectiveness of the power means, and means for applying operating force to the valve according to the pressure in the second pressure device, said power means comprising a cylinder, a plurality of pistons arranged in tandem therein connected by a hollow rod, and a rod connected to one of the pistons by a loose joint allowing universal action and extending into the first hydraulic pressure device to transmit power thereto as aforesaid.

7. A combined hydraulic and pneumatic control system comprising a master cylinder, a motor cylinder, an auxiliary master cylinder, a piston in the auxiliary cylinder having a passage therethrough, a connection between the motor cylinder and the auxiliary cylinder on one side of the piston, a connection between the master cylinder and the auxiliary cylinder on the other side of the piston, power means for exerting force on the piston, and means associated with the power means for closing the passage through the piston, said last named means comprising a rod actuated by the power means and a valve for closing the passage capable of universal swivelling movement relative to the rod so as to be self-aligning with the valve seat on the piston.

8. A combined hydraulic and pneumatic control system comprising a master cylinder, a motor cylinder, an auxiliary master cylinder, a piston in the auxiliary cylinder having a passage therethrough, a connection between the motor cylinder and the auxiliary cylinder on one side of the piston, a connection between the master cylinder and the auxiliary cylinder on the other side of the piston, power means for exerting force on the piston, and means associated with the power means for closing the passage through the piston, said last named means including a valve for closing the passage capable of universal swivelling movement so as to be self-aligning with the valve seat on the piston.

9. A combined hydraulic and pneumatic control system comprising a master cylinder, a motor cylinder, a cylinder intermediate the master cylinder and motor cylinder, a piston in the intermediate cylinder having a passage therethrough, a connection between the motor cylinder and the intermediate cylinder on one side of the piston, a connection between the master cylinder and the intermediate cylinder on the other side of the piston, power means for exerting force on the piston, means associated with the power means for closing the passage through the piston, said means comprising a rod actuated by the power means and a valve member urged to seat on the piston by the rod but movable relative to the rod and adapted to find its own seat on the piston, a valve for controlling the operation of the power means, and a connection between the valve and the master cylinder-intermediate cylinder connection.

10. A combined hydraulic and pneumatic control system comprising a master cylinder, a motor cylinder, a cylinder intermediate the master cylinder and motor cylinder, a piston in the intermediate cylinder having a passage therethrough, a connection between the motor cylinder and the intermediate cylinder on one side of the piston, a connection between the master cylinder and the intermediate cylinder on the other side of the piston, power means for exerting force on the piston, means associated with the power means for closing the passage through the piston, said means comprising a rod actuated by the power means and a valve member urged to seat on the piston by the rod but movable relative to the rod and adapted to find its own seat on the piston, a valve for controlling the operation of the power means, and a connection between the valve and the master cylinder which allows the pressure of the fluid in the master cylinder to operate the valve.

EARL R. PRICE.